United States Patent
Suzuki et al.

(10) Patent No.: US 8,882,183 B2
(45) Date of Patent: Nov. 11, 2014

(54) VEHICLE BODY STRUCTURE

(71) Applicant: Teijin Limited, Osaka (JP)

(72) Inventors: Koji Suzuki, Matsuyama (JP); Yutaka Yagi, Matsuyama (JP); Tadashi Yamaji, Matsuyama (JP); Masatomo Teshima, Matsuyama (JP)

(73) Assignee: Teijin Limited, Osaka-shi, Osaka (JP)

( * ) Notice: Subject to any disclaimer, the term of this patent is extended or adjusted under 35 U.S.C. 154(b) by 0 days.

(21) Appl. No.: 13/957,484

(22) Filed: Aug. 2, 2013

(65) Prior Publication Data

US 2014/0035308 A1    Feb. 6, 2014

Related U.S. Application Data

(63) Continuation of application No. PCT/JP2012/051556, filed on Jan. 25, 2012.

(30) Foreign Application Priority Data

Feb. 3, 2011    (JP) .................. 2011-021647

(51) Int. Cl.
| | | |
|---|---|---|
| *B60N 99/00* | (2006.01) |
| *B62D 25/20* | (2006.01) |
| *B62D 25/08* | (2006.01) |
| *B62D 29/04* | (2006.01) |
| *B62D 27/02* | (2006.01) |
| *B62D 25/04* | (2006.01) |
| *B62D 25/14* | (2006.01) |
| *B62D 31/00* | (2006.01) |

(52) U.S. Cl.
CPC .......... *B62D 27/023* (2013.01); *B62D 25/2009* (2013.01); *B62D 25/088* (2013.01); *B62D 29/048* (2013.01); *B62D 25/04* (2013.01); *B62D 25/145* (2013.01); *B62D 29/046* (2013.01); *B62D 31/003* (2013.01)
USPC ..................................................... 296/203.01

(58) Field of Classification Search
CPC ..... B62D 29/04; B62D 29/041; B62D 29/043
USPC .................... 296/29, 203.01, 203.02, 203.03, 296/203.04, 901
See application file for complete search history.

(56) References Cited

U.S. PATENT DOCUMENTS 2,115,913 A * 5/1938 Hicks ........................ 296/203.01
5,915,781 A * 6/1999 DeRees ..................... 296/203.01

(Continued)

FOREIGN PATENT DOCUMENTS

DE    10120044 A1    10/2002
EP     0372987 A2     6/1990

(Continued)

OTHER PUBLICATIONS

Written Opinion (PCT/ISA/237) with Partial English Translation issued in International Application No. PCT/JP2012/051556 mailed May 15, 2012.

(Continued)

*Primary Examiner* — Lori Lyjak
(74) *Attorney, Agent, or Firm* — Banner & Witcoff, Ltd.

(57) ABSTRACT

A vehicle body structure in which a vehicle body including an upper vehicle body and a lower vehicle body that are joined is constituted in whole or in part by a fiber-reinforced composite material, metal members are inserted into the respective upper vehicle body and lower vehicle body, the metal members being fastened to each other to form a joint portion, and at least two functional components are attached to the joint portion.

12 Claims, 9 Drawing Sheets

(56) References Cited

U.S. PATENT DOCUMENTS

2001/0033096 A1* 10/2001 Hanyu .................... 296/203.01
2004/0070229 A1    4/2004 Steinhauser et al.
2007/0182071 A1    8/2007 Sekido et al.

FOREIGN PATENT DOCUMENTS

| EP | 1372987 | | 1/2004 |
|----|---------|----|--------|
| FR | 2645106 | A1 | 10/1990 |
| JP | 64-032982 | | 2/1989 |
| JP | 01-103586 | | 4/1989 |
| JP | 09-309457 | | 2/1997 |
| JP | 2005-232601 | A | 9/2005 |
| JP | 2007-307944 | A | 11/2007 |
| JP | 04-478409 | B2 | 6/2010 |

WO    WO 2010092547 A1 *  8/2010

OTHER PUBLICATIONS

Written Opinion (PCT/IPEA/408) with Partial English Translation issued in International Application No. PCT/JP2012/051556 mailed Feb. 19, 2013.
International Search Report issued in corresponding International Application No. PCT/JP2012/051556 mailed May 15, 2012.
European Office Action mailed Mar. 25, 2014 in corresponding EP 12 742 625.2-1757.
European Communication mailed Mar. 10, 2014 in corresponding Application No. 12742625.2-1757.
Office Action issued on Jul. 8, 2014 in corresponding Japanese patent application JP 2012-515819 and a Concise Statement thereof.

* cited by examiner

VEHICLE BODY STRUCTURE

This application is a continuation of International Application No. PCT/JP2012/051556 filed on Jan. 25, 2012, and claims priority from Japanese Patent Application No. 2011-021647, filed on Feb. 3, 2011, the entire disclosure of which are incorporated herein by reference.

TECHNICAL FIELD

The present invention relates to a vehicle body structure constituted by a fiber-reinforced composite material.

BACKGROUND ART

In recent years, a vehicle body structure in which some part or the most part of a vehicle body are constituted by a synthetic resin and a fiber-reinforced composite material in order to reduce the weight of the vehicle body is known. For example, Patent Document 1 discloses a structure in which a vehicle body is divided into an upper vehicle body and a lower vehicle body, a frame of the upper vehicle body is formed of a synthetic resin into the shape of a closed cross section, and a reinforcing frame extending across the inner portion of the frame in the closed cross section is provided to connect the frame with the lower vehicle body. Patent Document 2 discloses, in order to simplify the vehicle body structure of a small vehicle, a structure in which a vehicle body is constituted by an upper vehicle body, a lower vehicle body, a front hood, and a rear bumper and the front hood is attached to a front side connecting portion connecting the upper vehicle body to the lower vehicle body. Patent Document 3 discloses a structure in which a front glass frame formed of a non-metal and high-strength material and a wall structure portion of a passenger space are joined via a flange.

CITATION LIST

Patent Document

Patent Document 1: JP-A-1-103586
Patent Document 2: JP-A-9-309457
Patent Document 3: Japanese Patent No. 4478409

SUMMARY OF INVENTION

Technical Problem

In order to significantly reduce the weight of a vehicle body structure, it is necessary that the most part of a vehicle body is constituted by a fiber-reinforced composite material. In order to efficiently manufacture the vehicle body, it is effective that at least two portions into which the vehicle body is divided as described above are molded and the molded portions are joined. However, functional components such as a suspension and a door are required to be attached to the vehicle body. The functional components apply a large load to the vehicle body (stress concentration occurs) due to the weight thereof and acceleration during operation. In general, it is not preferable to directly fasten the components, which apply the large load (stress concentration occurs), to the fiber-reinforced composite material. As an example of the countermeasures, it is necessary to insert an insert plate into each attachment portion of each component, but this leads to an increase in weight.

Solution to Problem

In order to solve the above problem, the inventors have conducted extensive studies and reached the present invention. The gist of the present invention is as follows:

(1) A vehicle body structure in which a vehicle body including an upper vehicle body and a lower vehicle body that are joined is constituted in whole or in part by a fiber-reinforced composite material,
wherein metal members are inserted into the respective upper vehicle body and lower vehicle body, the metal members being fastened to each other to form a joint portion, and
wherein at least two functional components are attached to the joint portion.

(2) The vehicle body structure of (1), wherein the functional components are selected from the group consisting of a suspension, a door, a front hood, a steering support, and a crushable structure.

(3) The vehicle body structure of (1) or (2), wherein a matrix of the fiber-reinforced composite material is a thermoplastic resin.

(4) The vehicle body structure according to any one of (1) to (3), wherein the fiber-reinforced composite material includes a carbon fiber as a reinforcing fiber.

(5) The vehicle body structure according to (3) or (4), wherein the fiber-reinforced composite material is a material in which reinforcing fibers are stacked to form into a random mat and impregnated with the thermoplastic resin.

Advantageous Effects of Invention

According to the present invention, it is possible to reduce the number of metal members required for joint of the upper vehicle body, the lower vehicle body, and the functional components, and thus the reduction of the weight of the vehicle body can be achieved. Also, the metal members required for joint can be set in a concentrated manner in fastening the metal members to each other so that the reliability of the joint can be increased.

DESCRIPTION OF EMBODIMENTS

The present invention relates to a vehicle body structure in which a vehicle body including an upper vehicle body and a lower vehicle body that are joined is constituted in whole or in part by a fiber-reinforced composite material, metal members are inserted into the respective upper vehicle body and lower vehicle body, the metal members is fastened to each other to form a joint portion, and at least two functional components are attached to the joint portion.

Hereinafter, embodiments of the present invention will be described in order referring to the accompanying drawings and specific embodiments therein. However, the present invention is not limited thereto.

Figure 1:
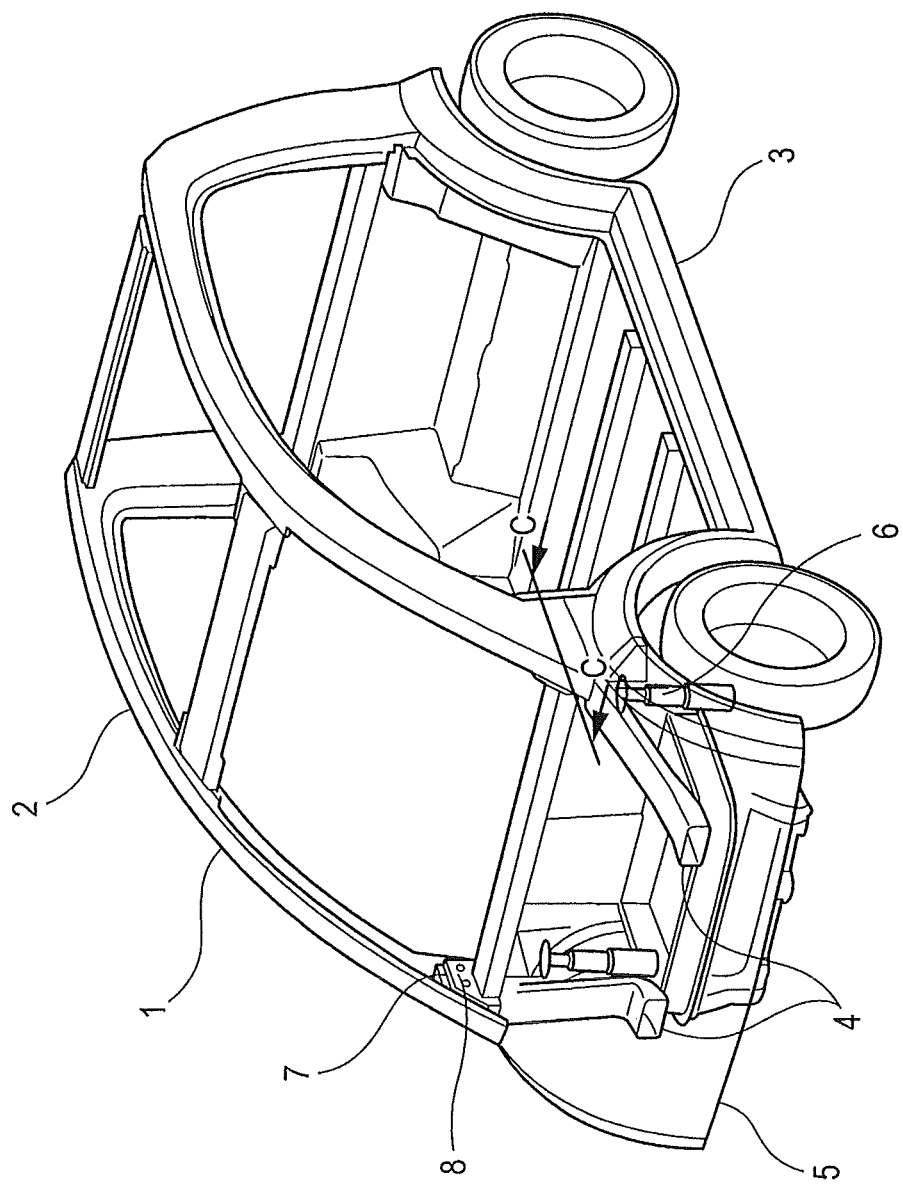
FIG. 1 is a perspective view of a passenger car including an embodiment of a vehicle body structure according to the present invention.

FIG. 1 illustrates a vehicle body (body) of a passenger car 1. The vehicle body includes an upper vehicle body 2, and a lower vehicle body 3; a front hood 5, a crushable structure 4, and a suspension 6 as functional components; and a front upper vehicle body metal joint 7, a rear upper vehicle body metal joint 7r, a front lower vehicle body metal joint 8, and a rear lower vehicle body metal joint 8r as metal members. The upper vehicle body 2 and the lower vehicle body 3 are formed of a carbon fiber-reinforced composite material (also known as carbon fiber-reinforced plastic (CFRP)) that is not a metal but is a high-strength material, and each of the upper vehicle body 2 and the lower vehicle body 3 includes metal joints as metal members to be joined. Also, the lower vehicle body 3 includes a floor and a side sill as functional components.

Furthermore, to be more specific with respect to FIG. 1, the 'joint portion' in the present invention refers to a portion where the front upper vehicle body metal joint 7 and the front lower vehicle body metal joint 8 are combined with each other in each of left and right portions of the vehicle body. The joint portion is located in a front portion of the vehicle body as illustrated in FIG. 1, but the joint may be located in a rear portion of the vehicle body. In other words, in the vehicle body structure according to the present invention, at least two of the functional components are attached to the joint portion in at least one of the front, rear, left, and right portions of the vehicle body. Representative embodiments of the vehicle body structure are an embodiment in which at least two of the functional components are attached to each of the joint portions in the left and right portions in the front portion of the vehicle body as illustrated in FIG. 1, and an embodiment in which at least two of the functional components are attached to each of the joints in the left and right portions in the rear portion of the vehicle body.

Figure 2:
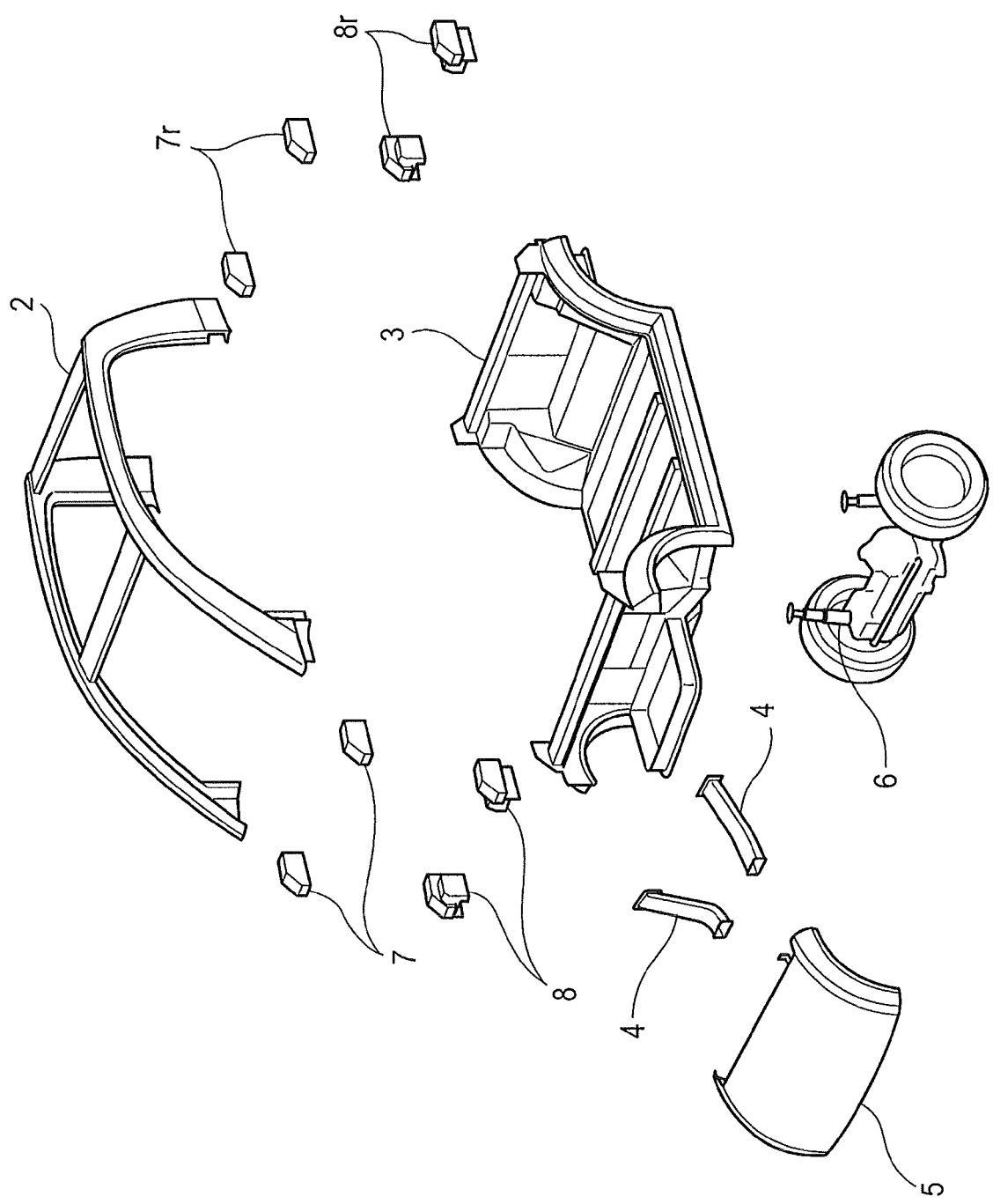
FIG. 2 is an exploded perspective view of the vehicle body structure of the passenger car of FIG. 1, illustrating an upper vehicle body, a lower vehicle body, respective functional components, and metal joints.

FIG. 2 is an exploded perspective view of the passenger car 1 of FIG. 1, illustrating the upper vehicle body 2, and the lower vehicle body 3; the crushable structure 4, the front hood 5, and the suspension 6 as the functional components; and the front upper vehicle body metal joint 7, the rear upper vehicle body metal joint 7r, the front lower vehicle body metal joint 8, and the rear lower vehicle body metal joint 8r as the metal members.

Figure 3:
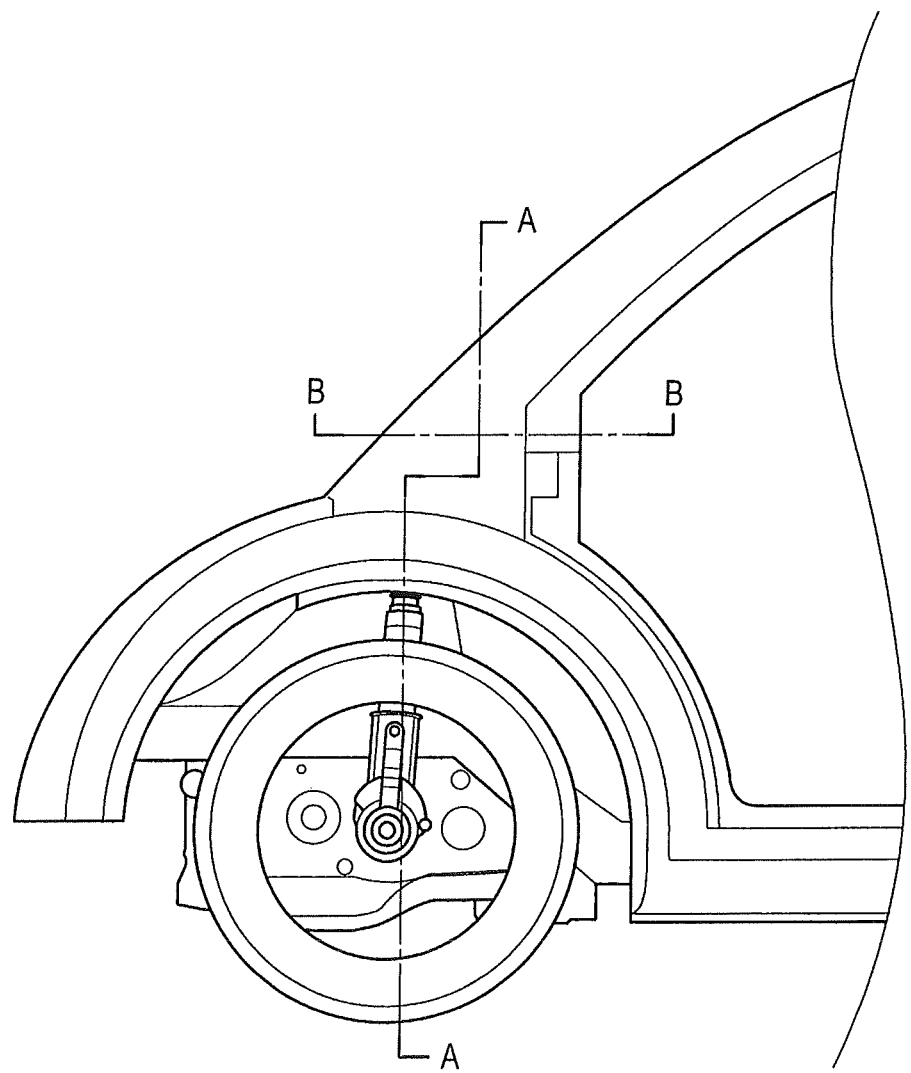
FIG. 3 is a front side view of the passenger car including the vehicle body structure based on the present invention.

FIG. 3 is a front side view of the passenger car 1.

Figure 4:
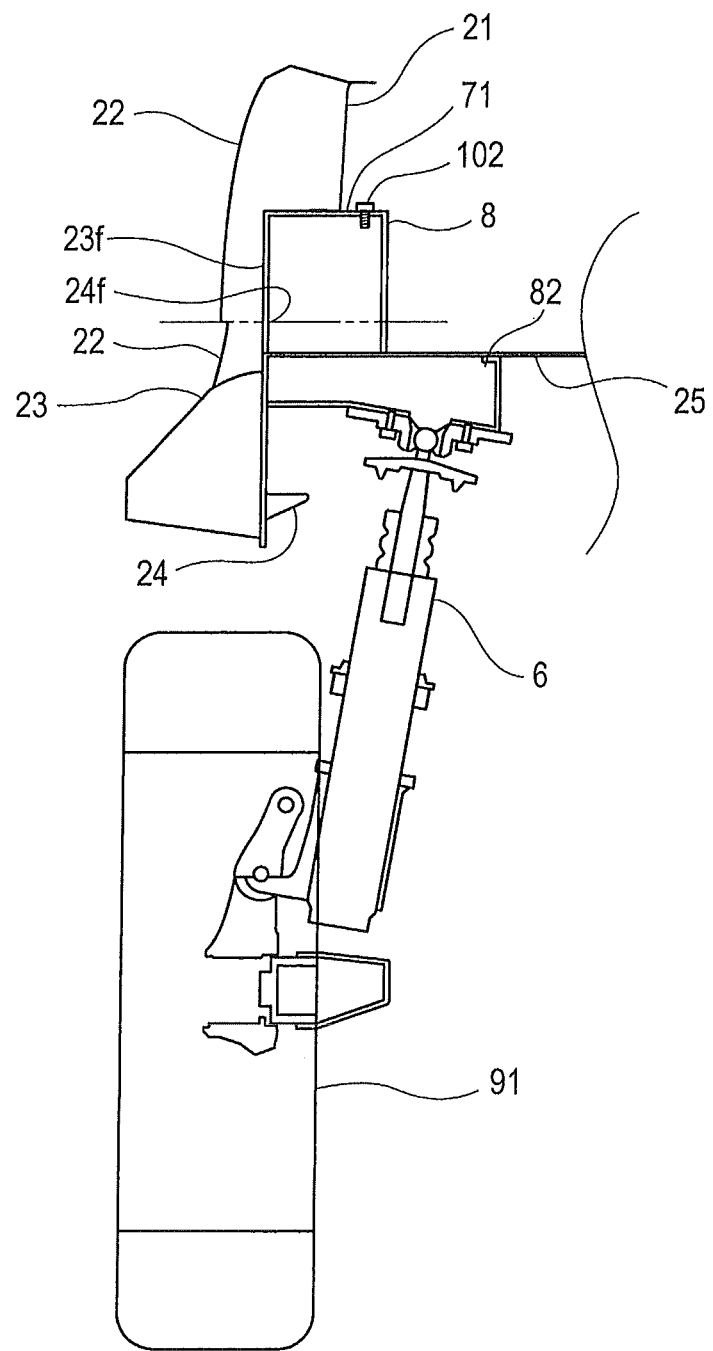
FIG. 4 is a cross-sectional view taken along line A-A of FIG. 3.
Figure 5:
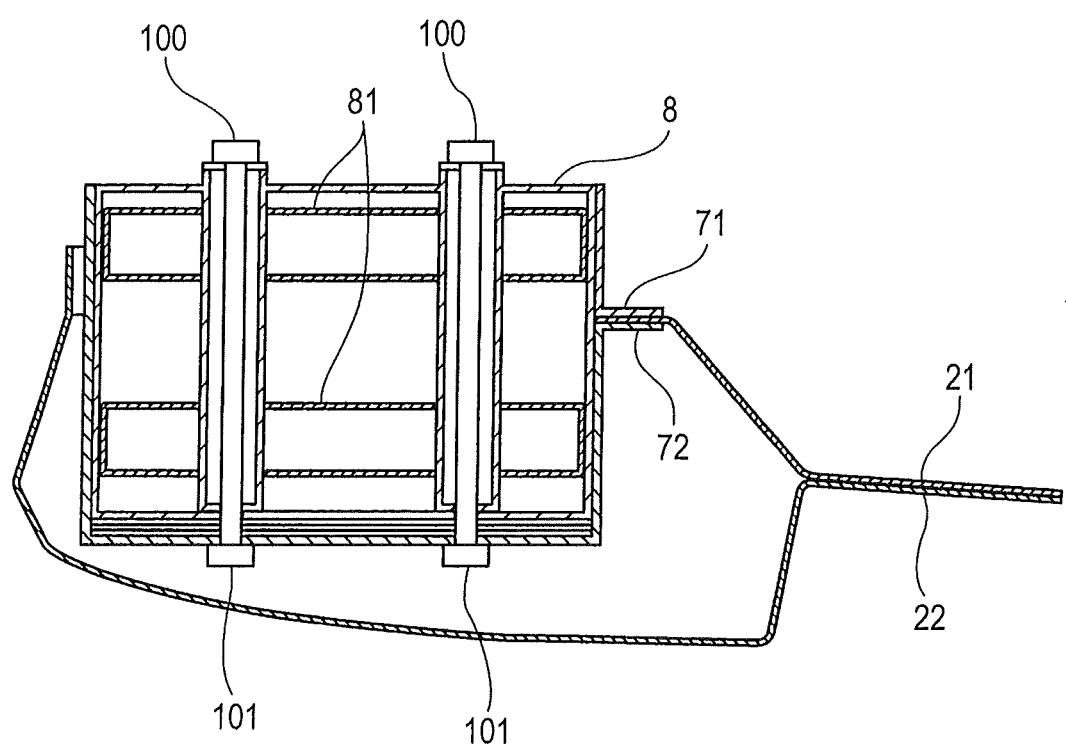
FIG. 5 is a cross-sectional view taken along line B-B of FIG. 3.

As illustrated in FIGS. 4 and 5, an upper vehicle body metal joint inner 71 is bonded to a pillar inner 21 that is a part of the upper vehicle body 2, and the upper vehicle body metal joint inner 71 and an upper vehicle body metal joint outer 72 are firmly bonded to a pillar outer 22. The upper vehicle body metal joint inner 71 and the upper vehicle body metal joint outer 72 are mechanically connected with the front lower vehicle body metal joint 8 by bolts 100 and 102, a nut 101, or the like, and the upper vehicle body and the lower vehicle body can be separated from each other. Also, a side sill outer flange 23f and a side sill inner flange 24f are provided at the front lower vehicle body metal joint 8 from a side sill outer 23 and a side sill inner 24 that are parts of the lower vehicle body, and the flanges are firmly bonded to the front lower vehicle body metal joint 8.

FIG. 4 illustrates a lower vehicle body suspension metal joint 82 that fixes the suspension 6 which is linked with a wheel 91. The lower vehicle body suspension metal joint 82 is firmly connected with the front lower vehicle body metal joint 8 by bonding or mechanical connecting using a bolt, a nut, a rivet, a screw, or the like.

Figure 6:
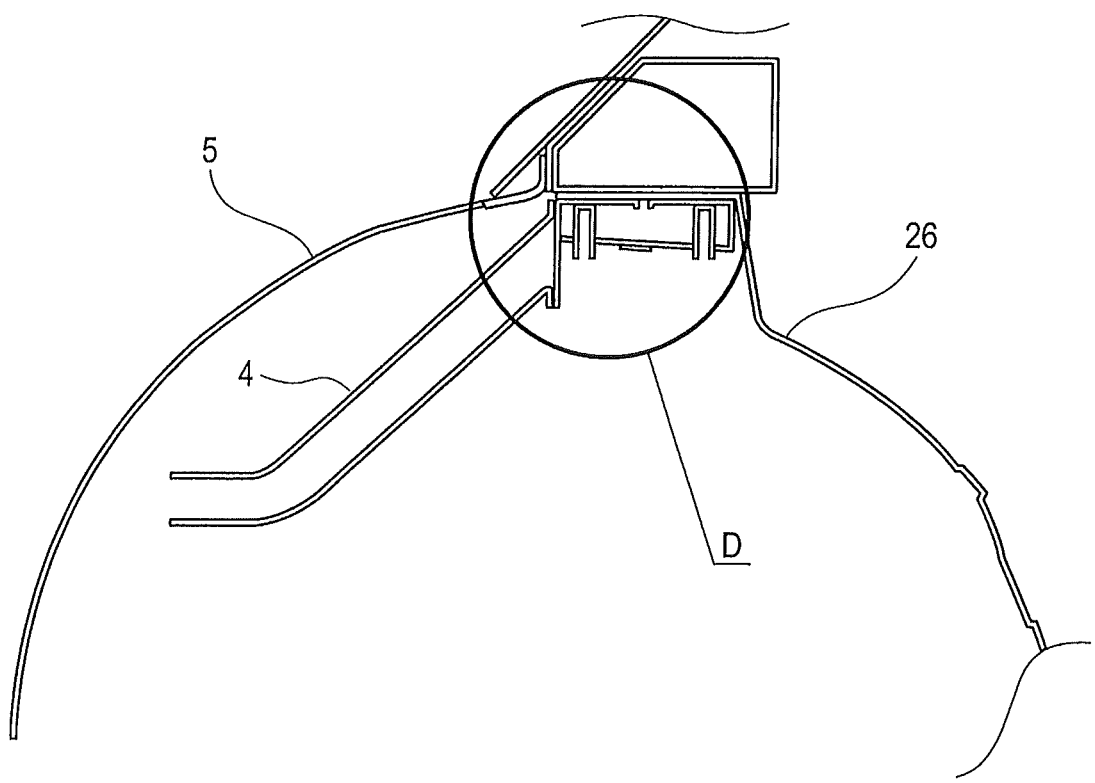
FIG. 6 is a cross-sectional view taken along line C-C of FIG. 1.
Figure 7:
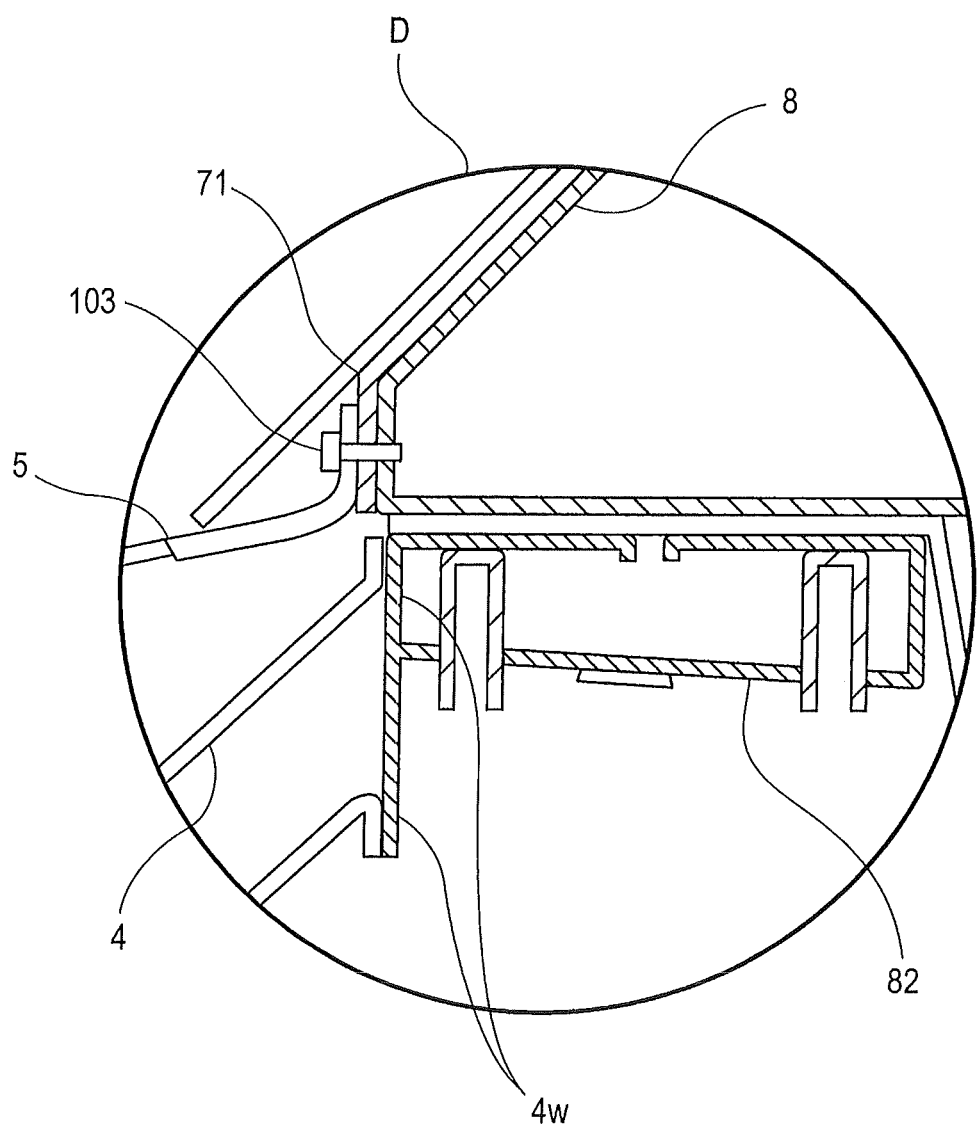
FIG. 7 is an enlarged view D of FIG. 6.

In FIGS. 6 and 7, the crushable structure 4 is welded to the front lower vehicle body metal joint 8 on a weld surface 4w, and the front hood 5 is mechanically connected with the front lower vehicle body metal joint 8 using a bolt 103 or the like.

Figure 8:
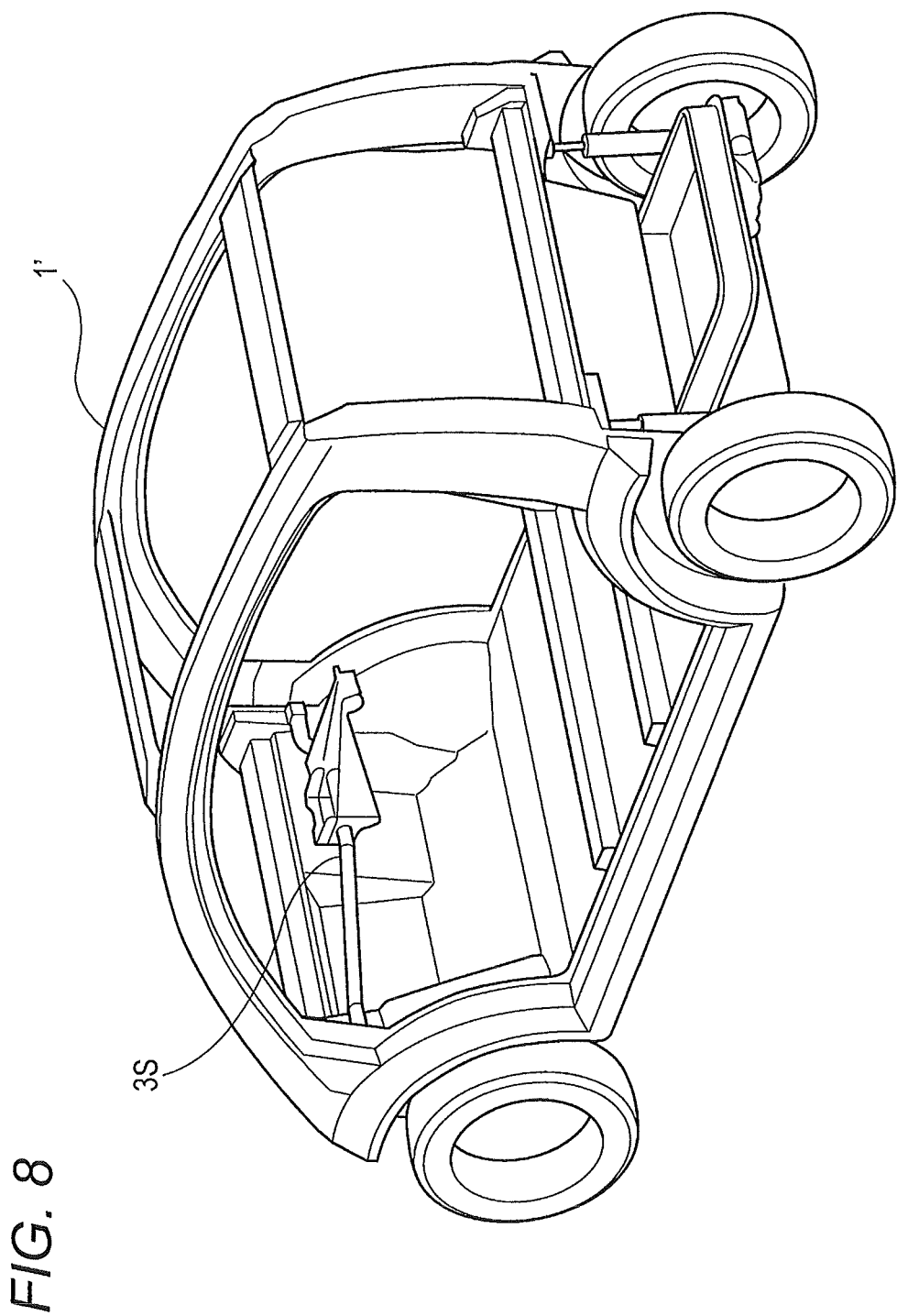
FIG. 8 is a perspective view of the passenger car including an embodiment of a vehicle body structure according to the present invention, to which a steering support and a suspension are attached as functional components.
Figure 9:
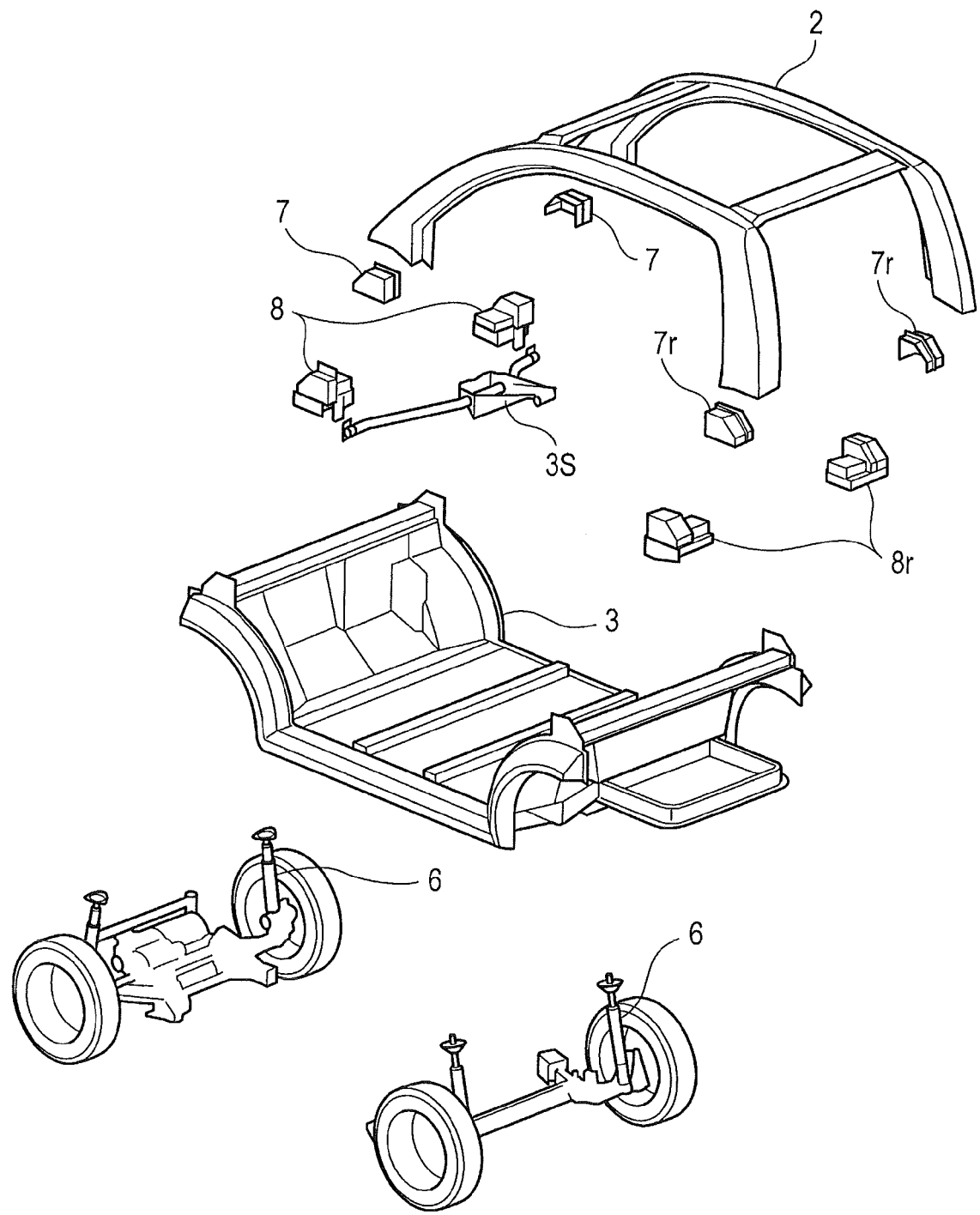
FIG. 9 is an exploded perspective view of the vehicle body structure of the passenger car of FIG. 8, illustrating an upper vehicle body, a lower vehicle body, respective functional components, and metal joints.

FIG. 8 is a perspective view of a passenger car 1' that includes an embodiment of the vehicle body structure according to the present invention, to which a steering support 3S and the suspension 6 are attached as functional components. FIG. 9 is an exploded perspective view of the passenger car 1' of FIG. 8, illustrating the upper vehicle body 2 and the lower vehicle body 3; the suspension 6 and the steering support 3S as functional components; and the front upper vehicle body metal joint 7, the rear upper vehicle body metal joint 7r, the front lower vehicle body metal joint 8, and the rear lower vehicle body metal joint 8r as metal members.

Hereinafter, each element constituting the present invention will be described.

[Fiber-Reinforced Composite Material]

According to the vehicle body structure of the present invention, the vehicle body including the upper vehicle body and the lower vehicle body that are joined is constituted, in whole or in part by the fiber-reinforced composite material. Herein, 'the vehicle body being constituted in whole by the fiber-reinforced composite material' means that an entire portion of the vehicle body structure which basically constitutes a vehicle, such as a frame, is constituted by the fiber-reinforced composite material, and does not mean that the vehicle body structure includes no metal component at all such as the bolt, the nut, the rivet, and the screw. Also, 'the vehicle body being constituted in part by the fiber-reinforced composite material' means that a part of one or both of the upper vehicle body and the lower vehicle body may be constituted by the fiber-reinforced composite material.

The fiber-reinforced composite material is a matrix (ingredient) such as a resin to which a reinforcing fiber is added. In the vehicle body structure according to the present invention, a known fiber-reinforced composite material can be used. For example, a layer body combining a portion of a fiber-reinforced composite material with a resin-only portion, or a fiber-reinforced composite material that has a sandwich structure can be used. In a case where the sandwich structure is used, a core member may be a fiber-reinforced composite material and a skin member may be a resin, or, conversely, the core member may be a resin-only portion and the skin member may be a fiber-reinforced composite material.

Also, it is preferable that the fiber-reinforced composite material used in the vehicle body structure according to the present invention is the reinforcing fiber that is stacked to form into a random mat and impregnated with a thermoplastic resin.

Of course, the fiber-reinforced composite materials used in the upper vehicle body, the lower vehicle body, and each portion of the upper vehicle body and the lower vehicle body of the vehicle body structure according to the present invention may be of the same type or of different types.

A matrix of the fiber-reinforced composite material according to the present invention may be a resin, but a thermoplastic resin is preferable because of excellent moldability, productivity, and workability thereof. Also, by using the thermoplastic resin as the matrix in the vehicle body, it is possible to increase breaking strain by approximately 20% when the thermoplastic resin is stretched in an axial direction in the middle of two axes. Preferred examples of the thermoplastic resin include at least one selected from the group consisting of vinyl chloride resin, vinylidene chloride resin, vinyl acetate resin, polyvinyl alcohol resin, polystyrene resin, acrylonitrile-styrene resin (AS resin), acrylonitrile-butadiene-styrene resin (ABS resin), acrylic resin, methacrylic resin, polyethylene resin, polypropylene resin, polyamide 6 resin, polyamide 11 resin, polyamide 12 resin, polyamide 46 resin, polyamide 66 resin, polyamide 610 resin, polyacetal resin, polycarbonate resin, polyethylene terephthalate resin, polyethylene naphthalate resin, polybutylene terephthalate resin, polyarylate resin, polyphenylene ether resin, polyphenylene sulfide resin, polysulfone resin, polyether sulfone resin, polyether ether ketone resin, and compositions including two types of these resins. Among these, more preferred is at least one selected from the group consisting of vinyl chloride resin, polystyrene resin, ABS resin, polyethylene resin, polypropylene resin, polyamide 6 resin, polyamide 66 resin, polyacetal resin, polycarbonate resin, polyethylene terephthalate resin, polyethylene naphthalate resin, polybutylene terephthalate resin, polyarylate resin, and compositions including two types of these resins. most preferred is at least one selected from the group consisting of polypropylene resin, polyamide 6 resin, polyamide 66 resin, and compositions including two types of these resins.

It is possible that examples of reinforcing fiber of the fiber-reinforced composite material used in the vehicle body structure according to the present invention include at least one selected from the group consisting of glass fiber, carbon fiber, aramid fiber, boron fiber, alumina fiber, silicon carbide fiber, high-density polyethylene fiber, polybenzoxazole (PBO) fiber, and mixtures containing two types of these fibers. In particular, carbon fiber is preferable because carbon fiber is light in weight and has excellent strength. As the carbon fiber, a known carbon fiber can be used, but a carbon fiber bundle aligned in one direction, that is, carbon fibers formed into a so-called unidirectional material, and carbon fibers stacked to form into a random mat, are preferred The fiber-reinforced composite material used in the present invention may include ingredients (non-fibrous fillers, various additives such as an antioxidant, and the like) other than the above-described matrix (resin) and reinforcing fiber as long as the ingredients do not impair the purpose of the present invention.

[Metal Member]

In the vehicle body structure of the present invention, known metal members can be used as the metal members that are respectively inserted into the joint portions of the upper vehicle body and the lower vehicle body and are fastened to each other in the joint portions. It is possible that representative examples thereof include at least one type of metal member selected from the group consisting of the metal joint, the metal joint inner, and the metal joint outer illustrated in the drawings.

[Functional Component]

In the vehicle body structure of the present invention, various functional components related to a vehicle structure and vehicle control can be used as at least two of the functional components attached to the joint portion where the metal members are fastened. In particular, preferred are at least two functional components selected from the group consisting of a suspension, a door, a front hood, a steering support, and a crushable structure. Furthermore, aspects of the vehicle body structure of the present invention includes an aspect in which at least two of the functional components are attached to the joint portion and also any one of the above-listed functional components is attached to a portion other than the join portion.

REFERENCE SIGNS LIST 1, 1' passenger car
2 upper vehicle body
3 lower vehicle body
3S steering support
4 crushable structure
4w weld surface
5 front hood
6 suspension
7 front upper vehicle body metal joint
7r rear upper vehicle body metal joint
8 front lower vehicle body metal joint
8r rear lower vehicle body metal joint
21 pillar inner
22 pillar outer
23 side sill outer
23f side sill outer flange
24 side sill inner
24f side sill inner flange
25 cross member
26 upper floor
71 upper vehicle body metal joint inner
72 upper vehicle body metal joint outer
81 lower vehicle body metal joint reinforcement unit
82 lower vehicle body suspension metal joint
91 wheel
100, 102, 103 bolt
101 nut

What is claimed is:

1. A vehicle body structure in which a vehicle body including an upper vehicle body and a lower vehicle body that are joined is constituted in whole or in part by a fiber-reinforced composite material,
wherein metal members are inserted into two or more portions in each of the upper vehicle body and the lower vehicle body, and the upper vehicle body and the lower vehicle body are joined by two or more joint portions in which the metal members inserted into the upper vehicle body and the metal members inserted into the lower vehicle body are fastened to each other,
further wherein at least two functional components are attached to the joint portion.

2. The vehicle body structure according to claim 1, wherein the functional components are selected from the group consisting of a suspension, a door, a front hood, a steering support, and a crushable structure.

3. The vehicle body structure according to claim 1, wherein the fiber-reinforced composite material includes a thermoplastic resin as a matrix.

4. The vehicle body structure according to claim 1, wherein the fiber-reinforced composite material includes a carbon fiber as a reinforcing fiber.

5. The vehicle body structure according to claim 1, wherein the fiber-reinforced composite material includes a thermoplastic resin as a matrix and a carbon fiber as a reinforcing fiber.

6. The vehicle body structure according to claim 3, wherein the fiber-reinforced composite material is a material in which reinforcing fibers are stacked to form into a random mat and impregnated with the thermoplastic resin.

7. The vehicle body structure according to claim 5, wherein the fiber-reinforced composite material is a material in which reinforcing fibers are stacked to form into a random mat and impregnated with the thermoplastic resin.

8. The vehicle body structure according to claim 1, wherein the joint portions are disposed in left and right portions in a front portion of the vehicle body.

9. The vehicle body structure according to claim 1, wherein the joint portions are disposed in left and right portions in a rear portion of the vehicle body.

10. The vehicle body according to claim 1, wherein the joint portions are disposed in left and right portions in a front portion of the vehicle body and left and right portions in a rear portion of the vehicle body.

11. The vehicle body structure according to claim 1, wherein the upper vehicle body includes at least one of a pillar inner and a pillar outer, and the metal members are inserted into the at least one of the pillar inner and the pillar outer.

12. The vehicle body structure according to claim 1, wherein the lower vehicle body includes at least one of a side sill inner and a side sill outer, and the metal members are inserted into the at least one of the side sill inner and the side sill outer.

* * * * *